United States Patent
Yudell et al.

(10) Patent No.: US 11,499,608 B2
(45) Date of Patent: Nov. 15, 2022

(54) INTEGRATED LAUNCH CLUTCH AND DRIVE SHEAVE FOR STEEL BELT CONTINUOUSLY VARIABLE TRANSMISSION

(71) Applicant: TEAM Industries, Inc., Bagley, MN (US)

(72) Inventors: Alexander C. Yudell, Bemidji, MN (US); Bruce H. Younggren, Bemidji, MN (US); Jordan E. Fisk, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 257 days.

(21) Appl. No.: 16/906,452

(22) Filed: Jun. 19, 2020

(65) Prior Publication Data

US 2020/0400221 A1    Dec. 24, 2020

Related U.S. Application Data (60) Provisional application No. 62/864,865, filed on Jun. 21, 2019.

(51) Int. Cl.
*F16H 9/18* (2006.01)
*F16D 48/02* (2006.01)
(Continued)

(52) U.S. Cl.
CPC ............ *F16H 9/18* (2013.01); *F16D 25/06* (2013.01); *F16D 25/14* (2013.01); *F16H 55/56* (2013.01); *F16D 13/52* (2013.01)

(58) Field of Classification Search
CPC .... F16H 9/18; F16H 61/66272; F16H 63/065; F16H 37/0846; F16H 57/0489; F16H 55/56; F16H 61/66263
(Continued)

(56) References Cited

U.S. PATENT DOCUMENTS 4,094,203 A * 6/1978 van Deursen ..... F16H 61/66263
                                                         474/28
4,475,416 A * 10/1984 Underwood ...... F16H 61/66263
                                                         474/18
(Continued)

FOREIGN PATENT DOCUMENTS

CA    2456633 A1    7/2004
EP    0063786 A1    11/1982
(Continued)

OTHER PUBLICATIONS

U.S. Patent and Trademark Office, "Notice of Allowance", U.S. Appl. No. 16/796,488, dated Mar. 11, 2022, pp. 1 through 9, Published: US.
(Continued)

*Primary Examiner* — Henry Y Liu
(74) *Attorney, Agent, or Firm* — Fogg & Powers LLC (57) ABSTRACT

An integrated launch clutch and drive sheave for a continuously variable transmission (CVT) is provided. The integrated launch clutch and drive sheave includes a drive sheave, a launch clutch and an integrated hydraulic system. The drive sheave includes a fixed sheave member that is statically mounted on and rotationally fixed to a drive sheave post and a movable sheave member that is slidably mounted on the drive sheave post. The launch clutch is in rotational communication with a motor. The launch clutch is configured to selectively couple engine torque from the motor to the drive sheave post of the drive sheave. The integrated hydraulic system is configured to both activate the launch clutch to selectively couple engine torque between the motor and the drive sheave and to axially move the movable sheave member on the drive sheave post of the drive sheave in relation to the fixed sheave member.

21 Claims, 9 Drawing Sheets

(51) Int. Cl.
 *F16H 55/56* (2006.01)
 *F16D 25/06* (2006.01)
 *F16D 13/52* (2006.01)

(58) Field of Classification Search
 USPC .................................................. 474/8, 28
 See application file for complete search history.

(56) References Cited

U.S. PATENT DOCUMENTS

| | | | | |
|---|---|---|---|---|
| 4,583,423 A * | 4/1986 | Hahne | ................... | F16H 37/022 475/210 |
| 4,699,259 A * | 10/1987 | McColl | ............... | F16D 25/0635 192/85.61 |
| 4,716,791 A * | 1/1988 | Ohzono | ................ | B60W 10/10 474/18 |
| 4,881,925 A * | 11/1989 | Hattori | .............. | F16H 61/66263 474/18 |
| 5,176,579 A * | 1/1993 | Ohsono | ................... | F16H 57/04 474/18 |
| 5,470,285 A * | 11/1995 | Schneider | ............. | F16H 37/022 475/210 |
| 5,568,853 A * | 10/1996 | Adriaenssens | ........ | F16H 63/065 192/85.28 |
| 5,667,448 A * | 9/1997 | Friedmann | ........ | F16H 61/66263 474/18 |
| 5,690,576 A * | 11/1997 | Moroto | ............... | F16H 37/0846 475/253 |
| 5,931,756 A * | 8/1999 | Ohsono | ................... | F16H 9/125 475/210 |
| 6,155,396 A * | 12/2000 | Tsubata | ............... | F16H 61/0021 192/85.42 |
| 6,332,856 B1 * | 12/2001 | Iwamoto | ................ | B60K 17/08 474/18 |
| 6,623,388 B1 * | 9/2003 | Senger | .............. | F16H 61/66272 474/18 |
| 6,679,796 B2 * | 1/2004 | Sugano | .................... | H02K 7/20 903/952 |
| 6,716,129 B2 * | 4/2004 | Bott | ........................ | F16H 55/56 475/116 |
| 7,410,042 B2 * | 8/2008 | Ochab | ........................ | F16D 25/08 192/48.92 |
| 8,002,653 B2 * | 8/2011 | Shiozaki | ................. | F02B 61/02 180/199 |
| 8,075,432 B2 * | 12/2011 | Oishi | ........................ | F16H 9/18 474/70 |
| 8,147,370 B2 * | 4/2012 | Nakajima | ............... | F16H 57/04 475/210 |
| 8,298,119 B2 * | 10/2012 | Jozaki | ............... | F16H 61/66259 477/41 |
| 9,371,896 B2 * | 6/2016 | Kobayashi | ............ | F16H 37/021 |
| 9,546,719 B2 * | 1/2017 | Sarnie | ................... | F16H 37/021 |
| 9,689,440 B2 * | 6/2017 | Tsukuda | ................ | B60W 10/02 |
| 10,088,025 B2 * | 10/2018 | Yamada | ........... | F16H 61/66272 |
| 10,240,667 B2 * | 3/2019 | Walter | ................... | F16H 37/022 |
| 10,948,081 B2 * | 3/2021 | Rippelmeyer | ......... | B60K 17/08 |
| 2004/0033851 A1 * | 2/2004 | Lubben | ................... | F16H 9/125 474/144 |
| 2004/0058760 A1 * | 3/2004 | Kuroda | ................. | F16H 63/067 474/18 |
| 2004/0077444 A1 * | 4/2004 | Kanda | ................... | F16H 37/021 474/8 |
| 2004/0171443 A1 * | 9/2004 | Borghi | ................. | F16H 63/067 474/12 |
| 2007/0144283 A1 * | 6/2007 | Hasegawa | ............. | B60K 17/04 74/325 |
| 2008/0268992 A1 * | 10/2008 | Mitsubori | ............... | F02B 41/00 474/17 |
| 2010/0167853 A1 * | 7/2010 | Morita | ...................... | F16H 9/18 474/144 |
| 2015/0345570 A1 * | 12/2015 | Tsukuda | ................. | F16D 13/76 192/3.63 |
| 2018/0252315 A1 * | 9/2018 | Rippelmeyer | .... | F16H 61/66272 |
| 2019/0242473 A1 * | 8/2019 | Hagihara | ................ | F16H 55/56 |
| 2020/0262292 A1 * | 8/2020 | Younggren | ........... | B60K 17/02 |
| 2020/0400222 A1 | 12/2020 | Yudell et al. | | |
| 2021/0341039 A1 * | 11/2021 | Kuroki | ..................... | F16H 9/18 |

FOREIGN PATENT DOCUMENTS

| | | |
|---|---|---|
| EP | 184676 A | 6/1986 |
| EP | 0787927 A2 | 8/1997 |
| EP | 2275706 A1 | 1/2011 |

OTHER PUBLICATIONS

International Bureau, "International Preliminary Report on Patentability from PCT Application No. PCT/JS2020/019068", from Foreign Counterpart to U.S. Appl. No. 16/796,488, dated Sep. 2, 2021, pp. 1 through 10, Published: WO.

U.S. Patent and Trademark Office, "Office Action", U.S. Appl. No. 16/796,488, dated Oct. 1, 2021, pp. 1 through 39, Published: US.

U.S. Patent and Trademark Office, "Office Action", U.S. Appl. No. 16/906,464, dated May 2, 2022, pp. 1 through 39, Published: US.

U.S. Patent and Trademark Office, "Final Office Action", U.S. Appl. No. 16/796,488, dated Jan. 31, 2022, pp. 1 through 11, Published: US.

International Searching Authority, "International Search Report and Written Opinion from PCT Application No. PCT/US2020/019068", from Foreign Counterpart to U.S. Appl. No. 16/796,488, dated Apr. 20, 2020, pp. 1 through 13, Published: WO.

* cited by examiner

INTEGRATED LAUNCH CLUTCH AND DRIVE SHEAVE FOR STEEL BELT CONTINUOUSLY VARIABLE TRANSMISSION

CROSS-REFERENCE TO RELATED APPLICATIONS

This application claims priority to U.S. Provisional Application Ser. No. 62/864,865, same title herewith, filed on Jun. 21, 2019, which is incorporated in its entirety herein by reference.

BACKGROUND

A typical continuously variable transmission (CVT) includes a drive sheave, a driven sheave and a belt. The drive sheave is operationally coupled to a motor while the driven sheave is operationally coupled to a drivetrain of a vehicle. The belt communicates torque between the drive sheave and driven sheave to communicate torque between the motor and drivetrain.

A typical drive sheave includes two sheave members. A first sheave member may be called a stationary sheave member because it is locked to a post or shaft of the drive sheave. A second sheave member may be called a moveable sheave member because it is designed to selectively translate (or axially move) along the axis of the post or shaft of the drive sheave. A gear ratio of the drive sheave may be controlled by either a torque sensitive assembly or it may be digitally controlled.

With a torque sensitive assembly, the torque sensitive assembly is in operational communication with the moveable sheave member and the post of the drive sheave to axially move the movable sheave member along the post. The more torque the drive sheave is experiencing, the more force the torque sensitive assembly applies to the movable sheave member causing a tighter squeeze on the belt. When the torque is reduced, less belt squeeze is applied to reduce frictional losses in the variator. In a digitally controlled system, inputs such as engine rpm, pedal position, vehicle pitch, and possibly some learning algorithm that predicts driver intent are used to change the rear ratio.

A CVT that uses steel belts (steel belt variators) must have constant tension in the belt. This results in a finite gear ratio in all operating conditions. During vehicle launch, a vehicle begins at a stationary, zero velocity condition. Since, in an internal combustion engine example, the engine must be spinning at some non-zero RPM to generate torque to move the vehicle, either an infinite gear ratio or slip between drive components is required. This slip continues while the vehicle accelerates and until the engine side of the powertrain synchronizes with the side of the drivetrain that is coupled to the wheels. Current applications address the slip with a fluid based torque converter that is in a series configuration between the engine and the steel belt drive sheave. Another possible solution is achieved through a centrifugal clutch or a single or multi-plate friction clutch in the same driveline location.

SUMMARY

The following summary is made by way of example and not by way of limitation. It is merely provided to aid the reader in understanding some of the aspects of the subject matter described. Embodiments provide a launch clutch and drive sheave for a CVT that implements an integrated hydraulic system that is configured to control both the launch clutch and the drive clutch.

In one embodiment, an integrated launch clutch and drive sheave for a CVT is provided. The integrated launch clutch and drive sheave includes a drive sheave, a launch clutch and an integrated hydraulic system. The drive sheave includes a fixed sheave member that is statically mounted on a drive sheave post and a movable sheave member that is slidably mounted on the drive sheave post. The launch clutch is in rotational communication with a motor. The launch clutch is configured to selectively couple engine torque from the motor to the drive sheave post of the drive sheave. The launch clutch is in hydraulic communication with the drive sheave. The integrated hydraulic system is configured to both activate the launch clutch to selectively couple engine torque between the motor and the drive sheave and to axially move the movable sheave member on the drive sheave post of the drive sheave in relation to the fixed sheave member.

In another embodiment, an integrated launch clutch and drive sheave for a continuously variable transmission (CVT) is provided. The integrated launch clutch and drive sheave for a CVT including a drive sheave, a launch clutch and a hydraulic system. The drive sheave including a fixed sheave member that is statically mounted on a drive sheave post and a movable sheave member that is slidably mounted on and rotationally fixed to the drive sheave post. The launch clutch is in rotational communication with a motor. The launch clutch is configured to selectively couple engine torque from the motor to the drive sheave post of the drive sheave. The launch clutch is in hydraulic communication with the drive sheave. The launch clutch includes a clutch pack and clutch piston. The clutch pack is configured to selectively couple torque between a motor and the drive sheave post. The clutch piston is configured to be manipulated by hydraulic pressure. The integrated hydraulic system providing hydraulic communication between the launch clutch and drive sheave, the hydraulic system configured to both activate the launch clutch to selectively couple engine torque between the motor and the drive sheave and to axially move the movable sheave member on the drive sheave post of the drive sheave in relation to the fixed sheave member. The hydraulic system includes at least one hydraulic pump configured to generate the hydraulic pressure. The drive sheave post has at least one drive sheave post passage that is configured to provide a passage for the hydraulic pressure from the hydraulic pump to at least a movable sheave chamber formed by the movable sheave member and a sheave stator.

In another embodiment, a vehicle is provided. The vehicle includes a motor, a drivetrain and a CVT that is configured to communicate torque between the motor and the drivetrain. The CVT has an integrated launch clutch and drive sheave. The integrated launch clutch and drive sheave includes a drive sheave, a launch clutch and an integrated hydraulic system. The drive sheave includes a fixed sheave member that is statically mounted on a drive sheave post and a movable sheave member that is slidably mounted on and rotationally fixed to the drive sheave post. The launch clutch is in rotational communication with a motor. The launch clutch is configured to selectively couple engine torque from the motor to the drive sheave post of the drive sheave. The launch clutch being in hydraulic communication with the drive sheave. The integrated hydraulic system providing hydraulic communication between the launch clutch and drive sheave, the hydraulic system configured to both activate the launch clutch to selectively couple engine torque between the motor and the drive sheave and to axially move the movable sheave member on the drive sheave post of the drive sheave in relation to the fixed sheave member.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a launch clutch for a steel belt CVT transmission that operates on a common pressure with the drive sheave. The drive sheave is commonly referred to as a drive clutch or primary sheave. Embodiments remove the need for a dedicated launch device hydraulic control valve and circuit as well as eliminates expensive and inefficient torque converters with the use of a simplified system design that implements common hydraulic pressure flow routing. In particular, embodiments provide an integrated launch clutch and drive sheave for a steel belt CVT that uses a plate style hydraulically actuated clutch as the launch clutch that is actuated by a same pressure as the drive sheave of the steel belt CVT. This design eliminates the cost and complexity of dedicated hydraulic valve and circuit to actuate the drive sheave. Further the design eliminates high unit and development cost of a torque converter and provides simplicity and packaging compactness of the steel belt CVT.

Figure 1:
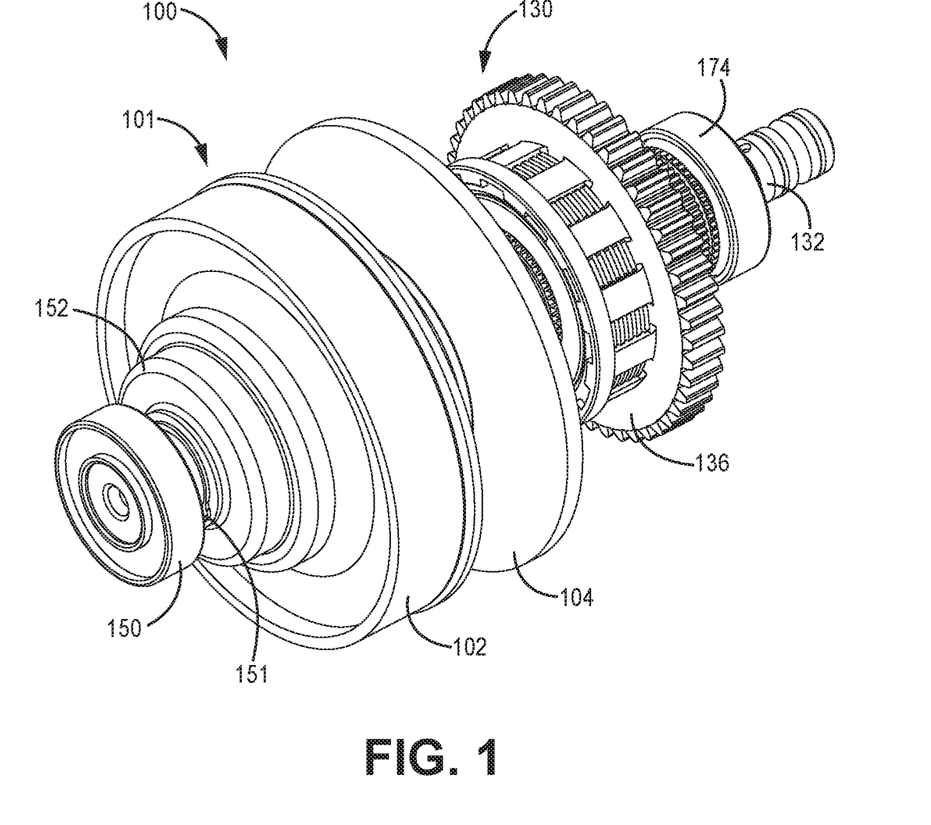
FIG. 1 is a side perspective view of an integrated launch clutch and drive sheave for a CVT according to one exemplary embodiment.
Figure 2:
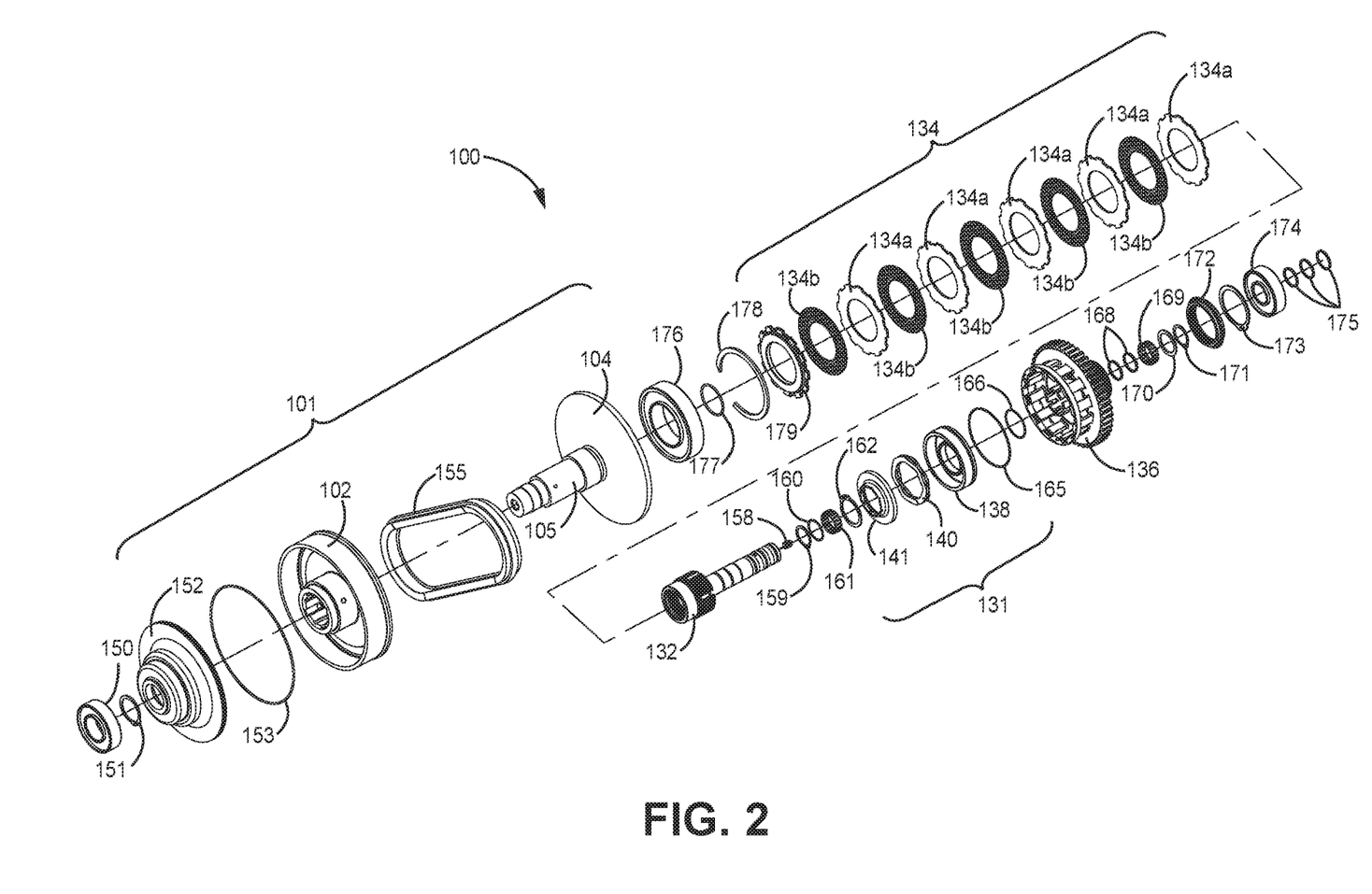
FIG. 2 is an unassembled side perspective view of the integrated launch clutch and drive sheave for a CVT of FIG. 1.
Figure 3:
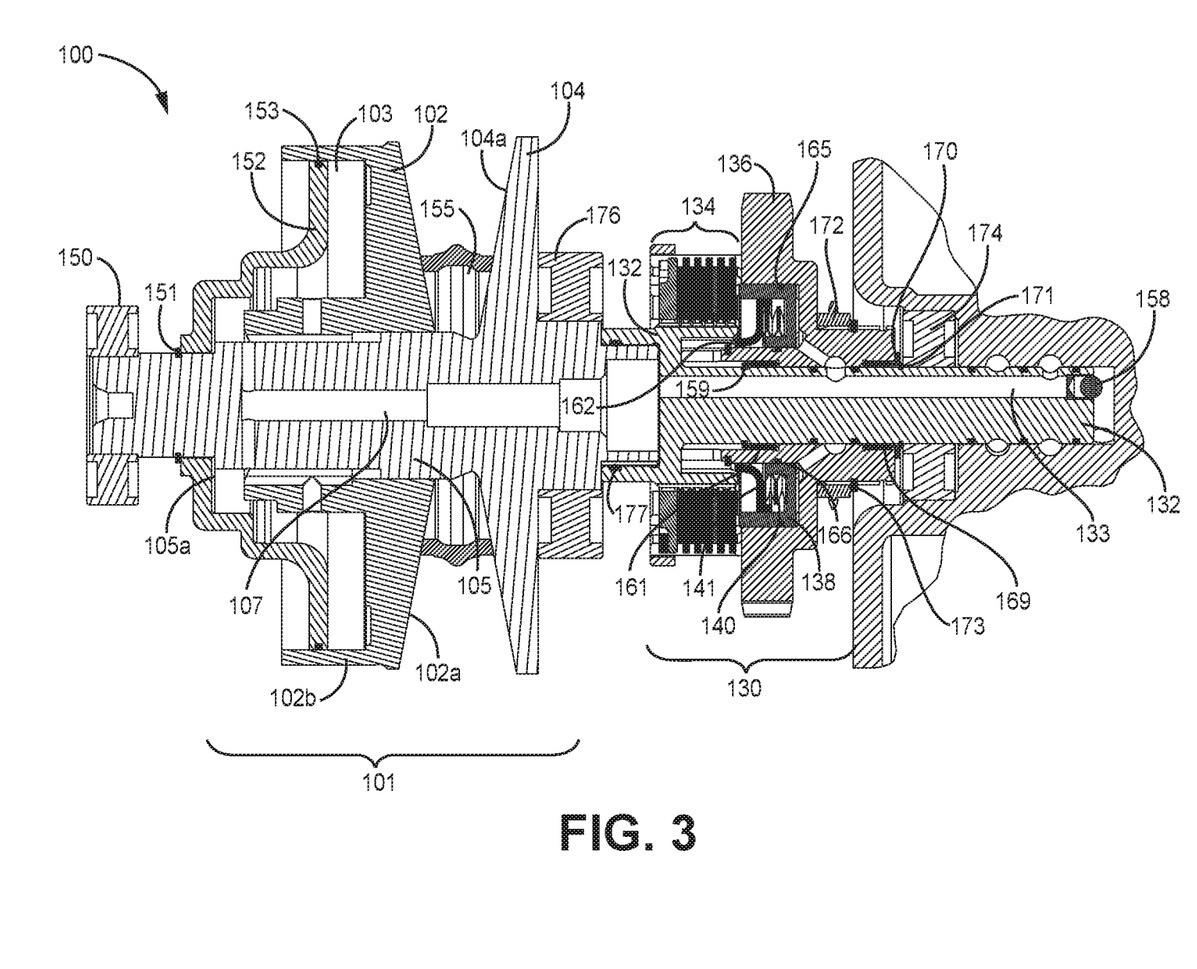
FIG. 3 is a cross-sectional side view of the integrated launch clutch and drive sheave for a CVT of FIG. 1.

FIG. 1 illustrates a side perspective view of an integrated launch clutch and drive sheave (ILCDS) 100 for a steel belt CVT according to one embodiment. FIG. 2 further illustrates ILCDS 100 unassembled and FIG. 3 illustrates an assembled cross-sectional side view of ILCDS 100. ILCDS 100 includes a launch clutch 130 and a drive sheave 101. The drive sheave 101 includes a fixed sheave member 104 and a movable sheave member 102. The movable sheave member 102 includes a conical movable sheave belt engaging surface 102a and a drum portion 102b (bests shown in FIG. 3), of a desired diameter, that extends away from the conical movable sheave belt engaging surface 102a. The movable sheave member 102 is slidably mounted on while rotationally fixed to a drive sheave post 105 of the fixed sheave member 104. ILCDS 100 further includes a sheave stator 152 that is mounted on the drive clutch post 105 and a sliding seal 153. As illustrated in FIG. 3, the sliding seal 153 is received in a groove of an outer perimeter edge of sheave stator 152 to form a seal between the outer perimeter edge of the sheave stator 152 and an inner drum surface of the drum portion 102b of the moveable sheave member 102. The sheave stator 152 is axially held in a static position on the drive sheave post 105 via snap ring 151 and a holding shoulder 105a that is formed in the drive sheave post 105. A movable sheave chamber 103 is formed between the sheave stator 152 and an inner drum 102b of the movable sheave member 102. As described below in detail, hydraulic pressure adjusts the size of the movable sheave chamber 103 to selectively move the movable sheave member 102 axially on the drive sheave post 105. In particular, the hydraulic force provided by the hydraulic pressure in the moveable sheave chamber 103 adjusts the ratio/sheave position as well as clamp force on the belt 155.

A belt 155 is positioned between movable sheave member 102 and the fixed sheave member 104 of the drive sheave 101. The belt 155 may be a push or pull type steel belt. The fixed sheave member 104 includes a conical fixed sheave belt engaging surface 104a. The belt 155 rides up and down between the conical movable sheave belt engaging surface 102a of the moveable sheave member 102 and the conical fixed sheave belt engaging surface 104a of the fixed sheave member 104 as the movable sheave member 102 move towards and away from the fixed sheave member 104. A pair of bearings 150 and 176 are mounted on opposite ends of the drive sheave post 105 and a bearing 174 is mounted on the end the launch clutch shaft 132. The bearings are used for mounting the ILCDS 100.

The launch clutch 130 includes a clutch pack 134 and a clutch basket 136. The clutch pack 134 includes alternatively positioned reaction plates 134a and friction plates 134b (generally referred to as launch clutch plates 134a and 134b). Reaction plates statically engage the clutch basket 136 and the friction plates statically engage a launch clutch shaft 132. The launch clutch shaft 132 is statically coupled to the drive sheave post 105 to transfer rotation between the post 105 and the shaft 132. In one embodiment, the static coupling is achieved with a spline coupling arrangement. An O-ring 177 is positioned within an inner groove of the launch clutch shaft 132 to create a seal within the coupling of the launch clutch shaft 132 and the drive sheave post 105.

A snap ring 178 is used in part to retain and position a clutch backing plate 179 that is positioned to one end of the clutch pack 134.

The launch clutch 130 further includes a launch activation assembly 131 (best illustrated in FIG. 2). The launch activation assembly 131 includes a clutch piston 138, a launch clutch spring retainer 141 and a bias member 140. The bias member 140 is a wave spring in this embodiment. The bias member 140 is positioned between the launch clutch spring retainer 141 and the clutch piston 138 to assert a basing force on the clutch piston 138. The launch clutch spring retainer 141 is held in a static position in relation to the launch clutch shaft with a snap ring 162. As discussed in detail below, hydraulic pressure selectively moves the clutch piston 138 to counter the bias of the bias member 140 to engage the clutch pack 134. Engagement of the clutch pack transfers torque between the launch clutch shaft 132 and the clutch basket 136. Statically engaged to the clutch basket 136 is a pump sprocket 172. The pump sprocket 172 is axially held in place on the launch clutch shaft 132 via snap ring 173. The pump sprocket 172 is used as a drive sprocket in a chain drive to a hydraulic pump (such as hydraulic pump 602 of FIG. 9) in an embodiment. The pump sprocket 172 may be located in other positioned in other embodiments.

A plurality of the rotary seals 168 and 175 are selectively positioned in grooves in the launch clutch shaft 132. O-rings 165 and 166 are positioned between an outer and inner edge of the clutch piston 138 and surfaces of the clutch basket 136 to form a seal between the clutch piston 138 and the clutch basket 136. Further, needle bearings 161 and 169 are positioned between the launch clutch shaft 132 and an interior surface of the clutch basket 136 to reduce rotational friction between the launch clutch shaft 132 and the clutch basket 136 when the clutch pack 134 is not activated. Needle bearing 161 is axially positioned in relation to the launch clutch shaft 132 at least in part via snap ring 159 and thrust washer 160 arrangement. Needle bearing 169 is axially positioned in relation to the launch clutch shaft 132 at least in part via snap ring 171 and thrust washer 170. Further a ball plug 158 is positioned within an end of a launch shaft passage 133 in the launch clutch shaft 132. The ball plug 158 configuration is used in this example embodiment to prevent hydraulic fluid from escaping out of hydraulic passage 133 in an end of the launch clutch shaft 132.

As discussed above the clutch pack 134 selectively couples torque between the clutch basket 136 and the launch clutch shaft 132. The clutch basket 136 is configured to be in rotational communication with a motor (such as motor 512 in FIG. 8). The clutch piston 138 selectively pushes the plurality of alternating launch clutch plates 134a and 134b together to transfer torque between the clutch basket 136 and the launch clutch shaft 132. The clutch piston 138 is activated by hydraulic fluid pressure that overcomes the bias force provided by biasing member 140. In embodiments, the same hydraulic circuit used to move the clutch piston 138 to activate and deactivate the clutch pack 134 is used to move the movable sheave member 102.

Figure 4:
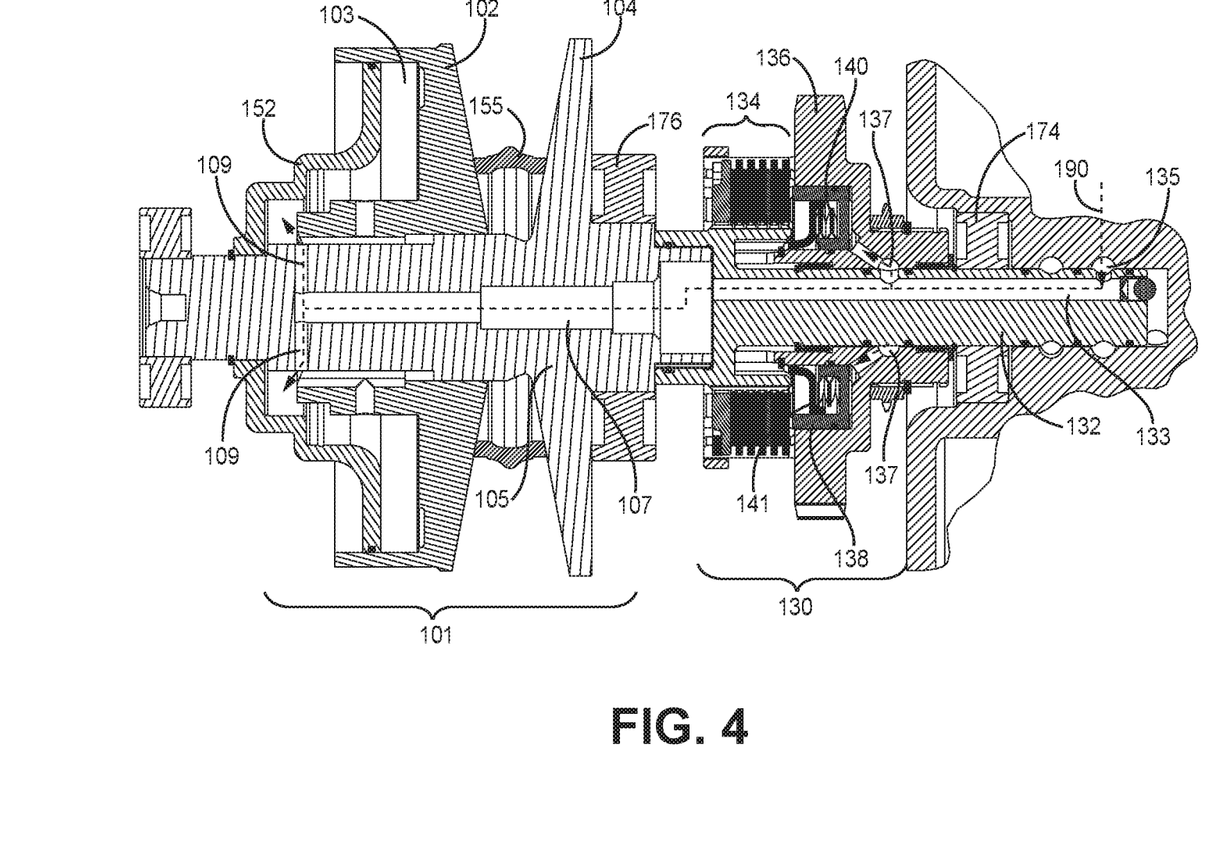
FIG. 4 is another cross-sectional side view of the integrated launch clutch and drive sheave for a CVT of FIG. 1 illustrating a pressure flow.

Referring to FIG. 4, a hydraulic pressure path 190 is shown that illustrates how the same hydraulic system is used to manipulate both the clutch pack 134 of the launch clutch 130 and the movable sheave member 102 of the drive sheave 101 in an embodiment. The launch clutch shaft 132 includes a launch shaft passage 133 that is aligned with a drive sheave post passage 107 in the drive sheave post 105. Hydraulic pressure is selectively introduced, from a hydraulic system 514 (shown in FIG. 8), into the launch shaft passage 133 through opening 135. The pressure is provided to the clutch piston 138 of the launch activation assembly 131 of the clutch pack 134 via plurality of clutch pack passages 137. Further the hydraulic pressure is passed to the movable sheave chamber 103 to move the movable sheave 102 via movable sheave passages 109.

As discussed above, steel belt CVTs always operate in a 'tight belt' configuration where a finite gear ratio is always maintained. Large slip events between the belt and the movable sheave belt engaging surface 102a of movable sheave member 102 and the fixed sheave belt engaging surface 104a of the fixed sheave member 104, that may occur on launch, are not acceptable, so an external launch coupling device is required. Embodiments may utilize a hydraulically actuated launch clutch 130 that is hydraulically connected to the drive sheave 101. In embodiments, the drive sheave pressure provides both the axial force required to transmit torque to the belt 155, as well as the thrust force required to clamp the launch clutch plates 134a and 134b.

Figure 5:
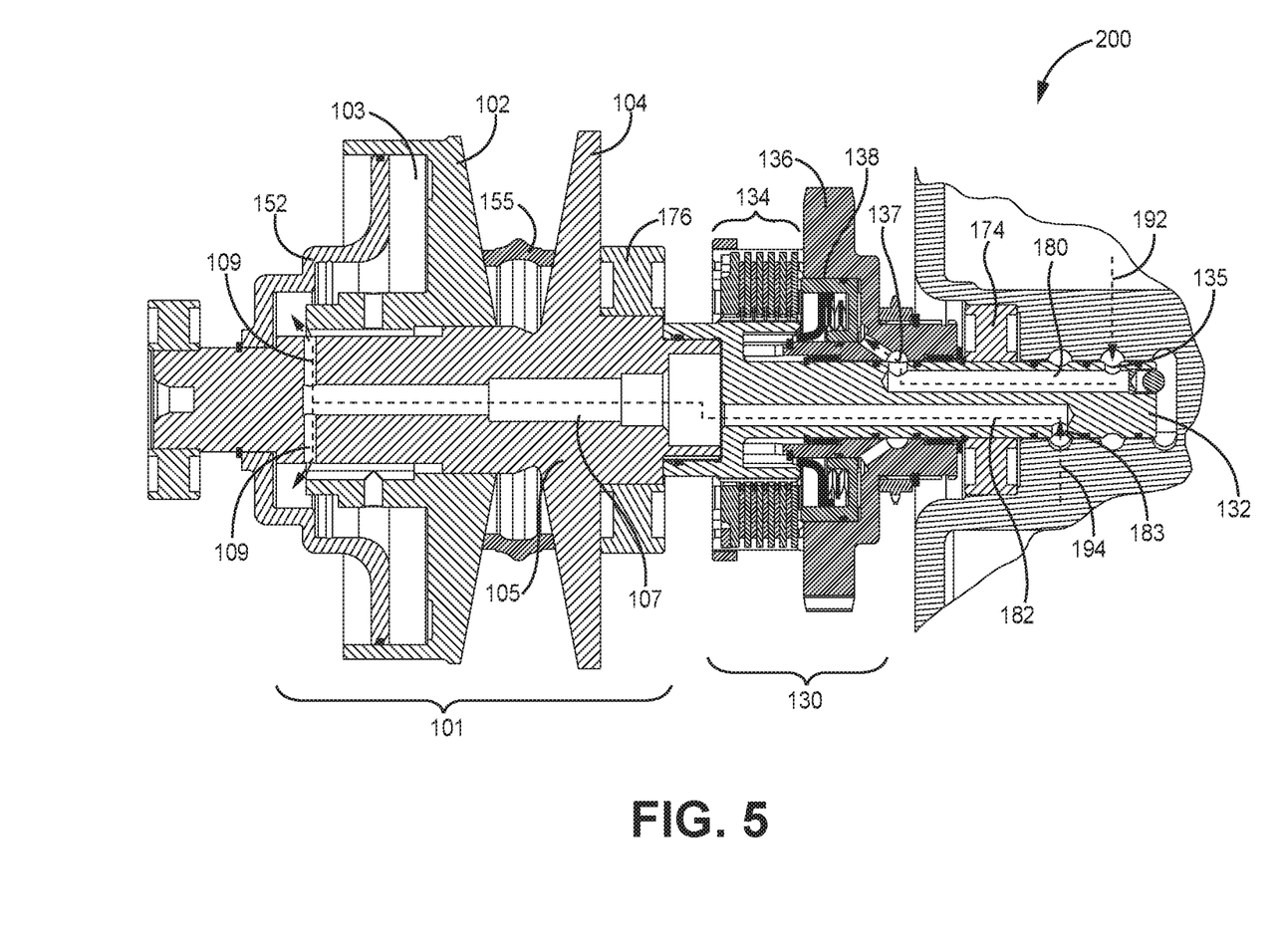
FIG. 5 is a cross-sectional side view of another integrated launch clutch and drive sheave for a CVT with a different pressure flow passages according to one exemplary embodiment.

FIG. 5 illustrates another embodiment of an ILCDS 200 for a CVT. This embodiment illustrates that different pressure flow passages may be used in different embodiments. Further, FIG. 5 illustrates an embodiment in which the movable sheave member 102 of the drive sheave 101 can be activated independently from the launch clutch 130. In this example, pressure 194 passing through opening 183 into a first launch post fluid passage 182 of the launch post 132 is aligned with the drive sheave post fluid passage 107 of the drive sheave post 105 to provide a path for the pressure through sheave passages 109 to the movable sheave chamber 103 of the movable sheave member 102 to selectively move the movable sheave member 102 on the drive sheave post 105. Further in this embodiment, separate second launch post fluid passages 180 are used to activate the launch activation assembly 131 to cause the launch piston 138 to engage the clutch pack 134. As illustrated, pressure 192 is introduced through opening 135 into the second launch post passage 180 is further passed through passage 137 in the clutch basket 136 to selectively provide pressure on the launch piston 138 of the launch activation assembly 131. In this example embodiment, the pressures 192 and 194 are hydraulically separated. Further, the launch clutch 130 may be actuated by pressure in the driven sheave 101. Hence, pressure passages through the drive sheave post 105 and the launch post 132 may vary in number, location, pressure routing location as well as size in activating the launch clutch 130 and drive sheave 101.

Figure 6:
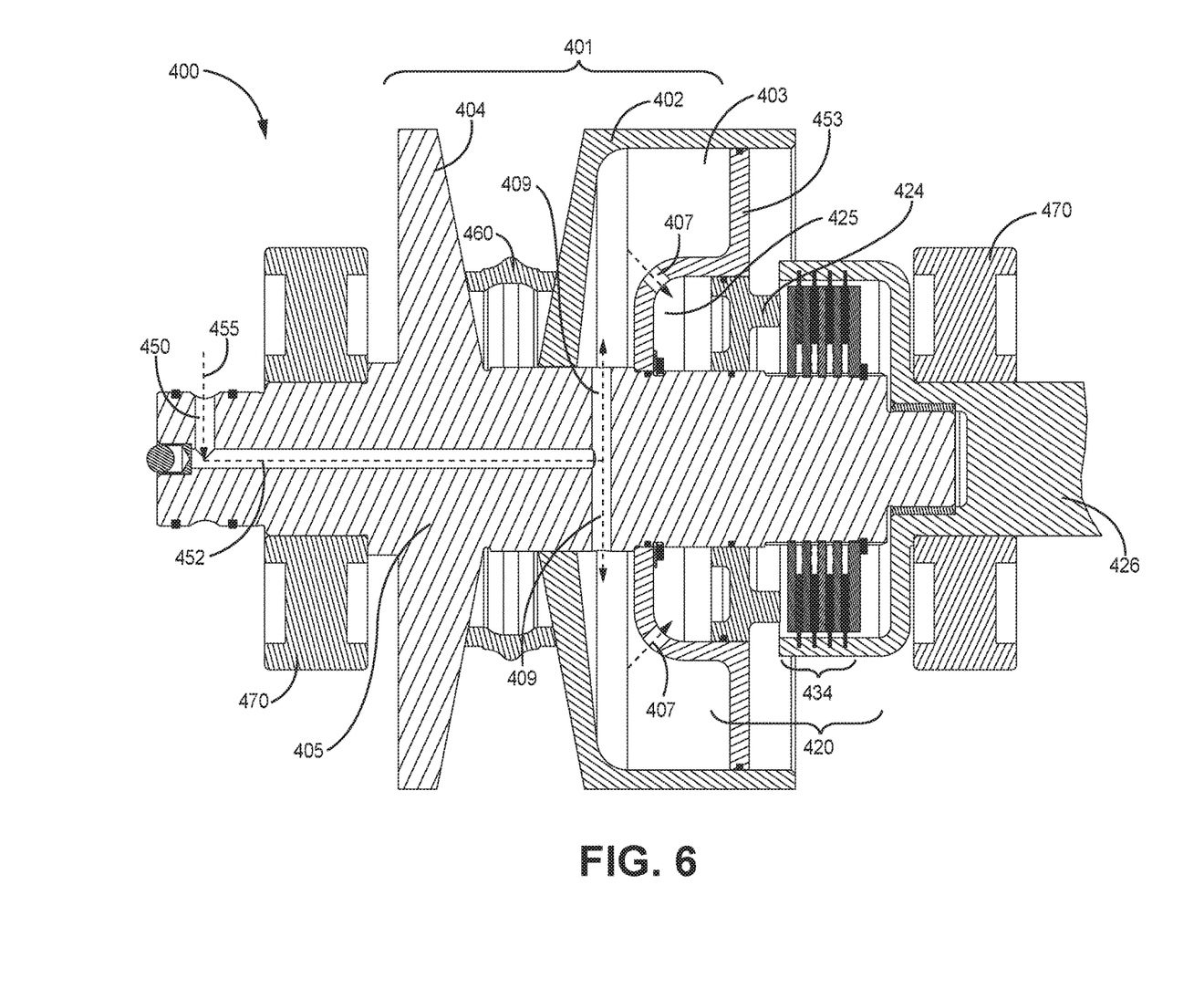
FIG. 6 is cross-sectional side view of yet another integrated launch clutch and drive sheave for a CVT according to one exemplary embodiment.

FIG. 6 illustrates yet another example of an ILCDS 400 of a CVT embodiment with an integrated hydraulic system that is used to activate both a drive sheave 401 and launch clutch 420. As in the other embodiments, the drive sheave 401 includes a fixed sheave member 404 and a movable sheave member 402. The fixed sheave member 404 includes (or is mounted on in an embodiment) a drive clutch post 405. The movable sheave member 402 is slidably mounted on the drive clutch post 405 and is activated by the integrated hydraulic system. The integrated hydraulic system includes a drive sheave post passage 452. Further a pressure path 450 provides a path from a hydraulic pump (such as pump 602 of FIG. 9) to the drive sheave post passage 452. Pressure 455 from the pump is passed to a movable sheave chamber 403 via movable sheave passages 409. Further, in this example embodiment, the pressure is further passed on to a launch clutch chamber 425 (which is part of the launch activation assembly of the launch clutch 420) via stator passages 407 through a sheave stator 453 that forms in part the movable sheave chamber 403. The stator passages 407 are configured to provide a path that equalizes hydraulic pressure between the launch clutch chamber 403 of the launch clutch 402 and the movable sheave chamber 403 of the drive sheave 401 such that the launch clutch 402 and drive sheave 401 may be activated by a same hydraulic signal used to control the hydraulic system (such as the hydraulic system 600 illustrated in FIG. 9).

A piston 424 of the launch activation assembly applies axial force on a clutch pack 434 of the launch clutch 420 based on the hydraulic pressure on the piston to selectively couple rotation of the drive sheave 401 with an input member 426. The input member 426 is in rotational communication with a motor (such as motor 512 of FIG. 8). As with the embodiment discussed above, the hydraulic system in this embodiment is also shared between the drive sheave 401 and the launch clutch 420. Also illustrated in FIG. 6 is a steel belt 460. Steel belt 460 couples torque between the drive sheave 401 and a driven sheave (such as driven sheave 504 of FIG. 8). Bearings 470 and 470 are used to mount the ILCDS 400.

In embodiments, the launch clutch plates, such as launch plates 134a and 134b of ILCDS 100 and 200 as well as the launch clutch plates in ILCDS 400, and the launch activation assembly, such as launch activation assembly 131 of ILCDS 100 and 200 as well as a launch activation assembly of ILCDS 400, are selected such that the launch clutch 130 or 420 transmit less torque than the primary belt 155 or 460 to sheave interface engaging surfaces 102a and 104a of the movable and stationary sheaves members 102 and 104 or 404 and 402. This ensures that slip occurs in the launch clutch 130 or 420, and not between the drive sheave 101 or 401 and belt 155 or 460. A number of factors are in play when considering the sizing of the piston area of the launch activation assembly 131 and number of clutch plates 134a and 134b, including gear ratio, maximum coefficient of friction between the belt and sheave, clutch plate coefficient of friction, engine rpm at launch conditions (centrifugal pressure rise). In some embodiments, a balancing of the factors in a launch clutch 130 and 420 are selected to achieve a lower torque transmission than the drive sheave 101 and 401 under all launch conditions.

Figure 7:
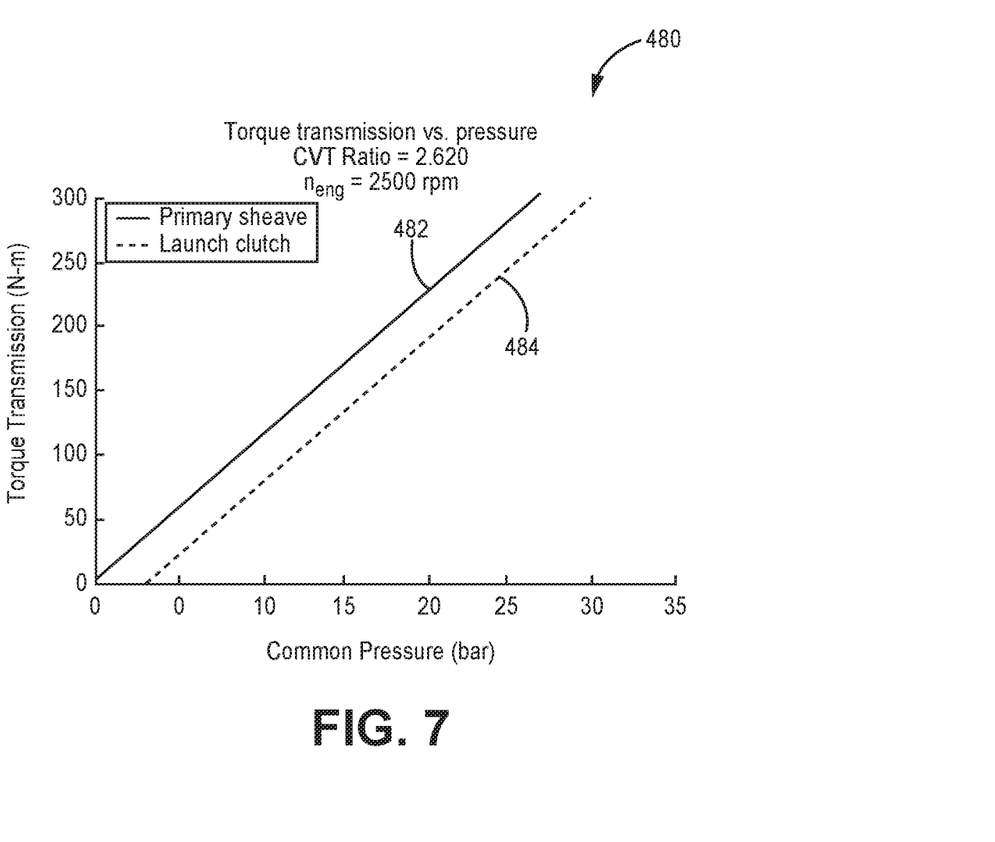
FIG. 7 is a pressure vs. torque plot according to one exemplary embodiment.

Referring to FIG. 7, a pressure vs. torque plot 480 of an example embodiment is illustrated. This plot 480 shows an example simulation of launch conditions where plot line 482 associated with the primary sheave 482 is set as illustrated as transmitting more torque than plot line 484 associated with launch clutch 484 at all applied pressure levels in an embodiment. In some embodiments, the launch clutch, such as launch clutch 130 utilizes bias member 140 to prevent piston movement and hence torque transmission under a threshold pressure of 3 bar. That is, in this embodiment, a bias member 140 in the launch clutch 130 is used, at least in part, to differentiate the activation sensitivity between the movable sheave 102 and launch clutch 130. The 3 bar example is called the "kisspoint pressure" and may be any value. A typical kisspoint pressure is in a range between 1 to 10 bar.

An example launch sequence begins with a vehicle stationary and the engine at idle. The engine flares to a predetermined launch speed. The pressure common to the launch clutch 130 and drive sheave 101 begins to rise. The drive sheave 101 has no or little preload, and applies axial thrust to the belt immediately. This axial thrust clamps the belt and increases the friction force at the belt/sheave interface. Pressure rises further, until the preload force at the launch clutch piston 138 is overcome. The piston 138 travels and begins to apply a thrust load to the at least one clutch plate 134. The thrust load through the plates 134 applies a friction force on the plates 134, and torque is transmitted across the launch clutch 130, through the drivetrain and to the wheels.

At this moment, the vehicle speed is zero, and the engine speed is some finite launch speed. This demands that there is slip somewhere in the driveline until such a time that the components are synchronized. Since the drive sheave 101 of the steel belt CVT 100 is capable of transmitting more torque than the launch clutch 130, the slip necessarily occurs at the launch clutch 130, and not between the drive sheave 101 and the belt, which would cause damage to the CVT 100. The vehicle accelerates until the driven side the clutch matches the driving or engine side of the clutch. Synchronization occurs, and the clutch plates 134a and 134b cease relative motion. The clutch is now "locked up." Pressure to the launch clutch 130 and primary clutch 130 is managed in a way that ensures that the launch clutch 130 does not unlock until the engine speed drops to the idle value. This would occur when the vehicle is coming to a stop or slows to a very low speed, for example to navigate an obstacle. In another embodiment, the clutch is unlocked at a speed greater than idle.

Figure 8:
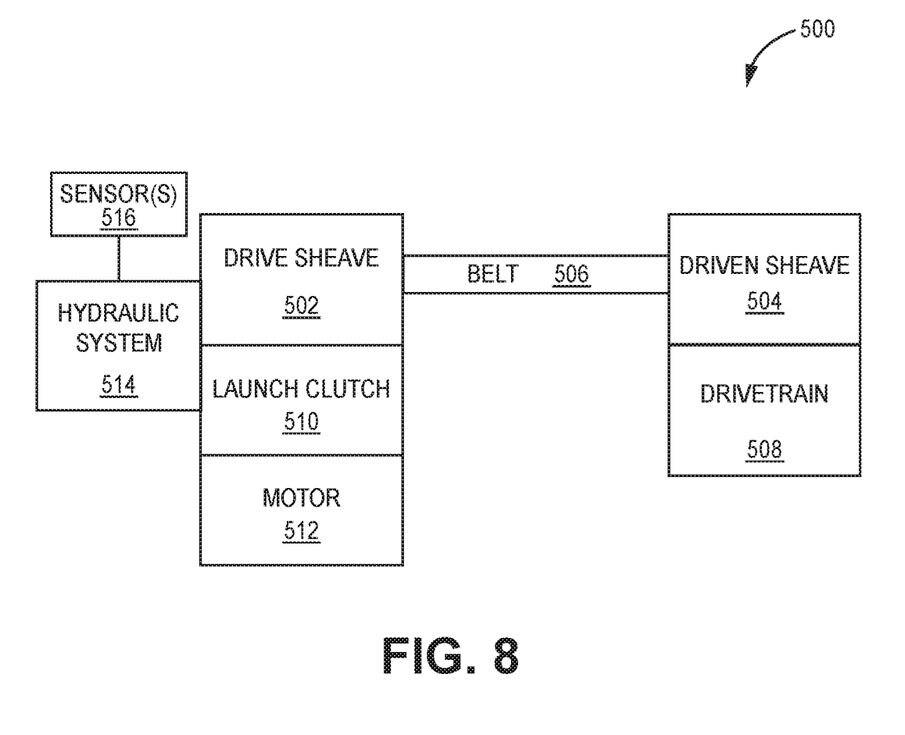
FIG. 8 is a block diagram of vehicle implementing an integrated launch clutch and drive sheave for a CVT according to one exemplary embodiment.

FIG. 8 illustrates a block diagram of a vehicle 500 including a CVT of an embodiment. The CVT includes a drive sheave 502 that is in rotational communication with a driven sheave 504 via belt 506. The driven sheave 504 is further in rotational communication with a drivetrain 506 to transfer torque between the belt 506 and the drivetrain 508. The drivetrain 508 may include further gearing, drive shafts, half shafts, differentials, wheels, etc. The CVT further includes a launch clutch 510 that is in operational communication with the drive sheave 502 as discussed above. A motor 512 provides engine torque to the launch clutch 510. Further as discussed above, a single hydraulic system 514 provides hydraulic pressure to selectively manipulate a movable sheave of the drive sheave 502 and a clutch pack of the launch clutch 510 as discussed above. The hydraulic system 514 selectively manipulates the movable sheave of the drive sheave 502 and the clutch pack of the launch clutch 510 with one or more sensor signals from one or more sensors 516 in an embodiment. The sensors may include a motor rpm sensor, one or more speed sensors, a throttle position sensor, a torque sensor, etc.

Figure 9:
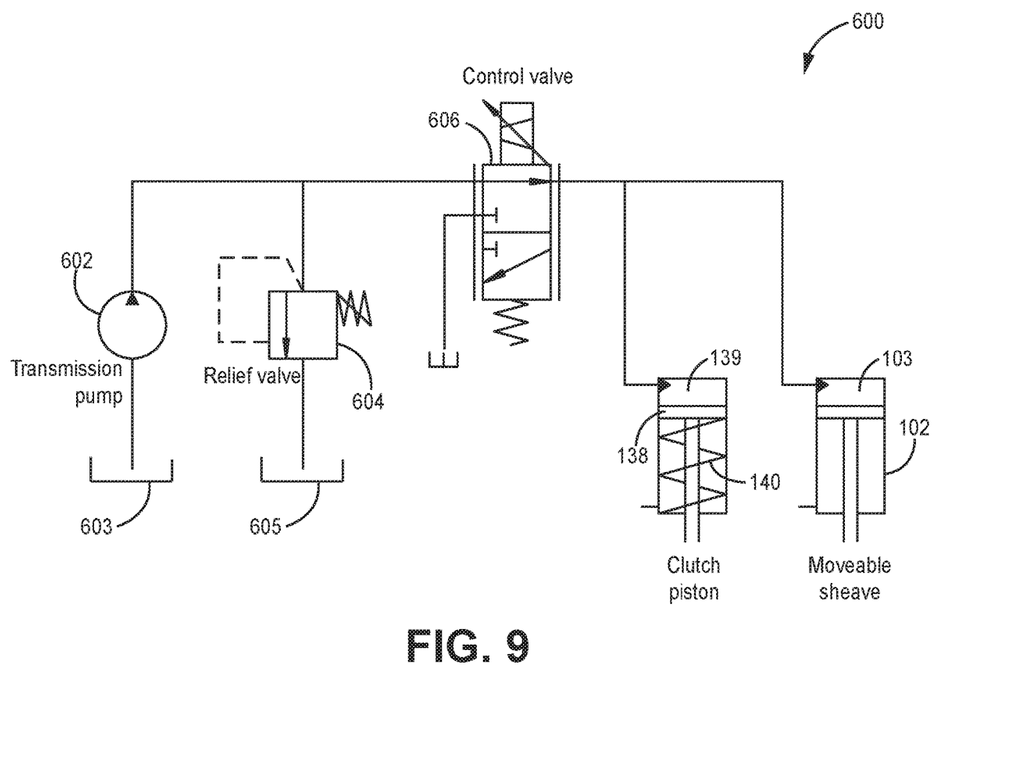
FIG. 9 is a schematic diagram of a hydraulic system according to one exemplary embodiment.

An example of a hydraulic system 600 used to move the launch clutch piston 138 and the movable sheave 102 is illustrated in FIG. 9. As illustrated, the hydraulic system 600 includes a transmission (or hydraulic) pump 602 that pumps a fluid from a reservoir 603 and a relief valve 604 that expels fluid into a reservoir 605. In an embodiment, reservoir 603 and 605 may be in hydraulic communication. A control valve 606 is used to control the fluid flow and pressure to a piston chamber 139 to move the launch clutch piston 138 and the sheave chamber 103 to move the movable sheave 102 of the drive sheave 101. FIG. 9 also illustrates the bias member 140 biasing the launch clutch piston 138 to differentiate when the launch clutch piston 139 is moved from when the movable sheave member 102 is moved by shared hydraulic pressure in an embodiment.

EXAMPLE EMBODIMENTS

Example 1 includes an integrated launch clutch and drive sheave for a continuously variable transmission (CVT). The integrated launch clutch and drive sheave includes a drive sheave, a launch clutch and an integrated hydraulic system. The drive sheave includes a fixed sheave member that is statically mounted on a drive sheave post and a movable sheave member that is slidably mounted on and rotationally fixed to the drive sheave post. The launch clutch is in rotational communication with a motor. The launch clutch is configured to selectively couple engine torque from the motor to the drive sheave post of the drive sheave. The launch clutch is in hydraulic communication with the drive sheave. The integrated hydraulic system is configured to both activate the launch clutch to selectively couple engine torque between the motor and the drive sheave and to axially move the movable sheave member on the drive sheave post of the drive sheave in relation to the fixed sheave member.

Example 2 includes the integrated launch clutch and drive sheave for a CVT of Example 1, wherein the integrated hydraulic system further includes a hydraulic pump to generate hydraulic pressure. The drive sheave post has at least one drive sheave post passage that is configured to provide a passage for the hydraulic pressure from the hydraulic pump to at least one movable sheave chamber formed by the movable sheave member and a sheave stator.

Example 3 includes the integrated launch clutch and drive sheave for a CVT of Example 2, further including a launch clutch shaft. The launch clutch is mounted on the launch clutch shaft. The launch clutch shaft has at least one launch shaft passage. The at least one launch shaft passage provides a passage for the hydraulic pressure to the launch clutch.

Example 4 includes the integrated launch clutch and drive sheave for a CVT of Example 3, wherein at least one launch shaft passage of the launch clutch shaft is in fluid communication with at least one drive sheave post passage of the drive sheave post.

Example 5 includes the integrated launch clutch and drive sheave for a CVT of Example 2, wherein the sheave stator including at least one stator passage configured to provide a path that equalizes hydraulic pressure between a launch clutch chamber of the launch clutch and a movable sheave chamber of the drive sheave such that the launch clutch and drive sheave are activated by a same hydraulic signal used to control the hydraulic system.

Example 6 includes the integrated launch clutch and drive sheave for a CVT of Example 2, wherein the integrated hydraulic system further includes a hydraulic control valve that is in fluid communication with the hydraulic plump. The hydraulic control valve is configured to control fluid flow and pressure to the launch clutch and the drive sheave such that the hydraulic control valve, the launch clutch and drive sheave are all in hydraulic communication.

Example 7 includes the integrated launch clutch and drive sheave for a CVT of any of the Examples 1-7, wherein the launch clutch further includes a clutch basket that is in rotational communication with the motor, a clutch pack that is configured to selectively couple torque between the clutch basket and the drive sheave post and a clutch piston that is configured to be manipulated by hydraulic pressure from the integrated hydraulic system to selectively activate the clutch pack.

Example 8 includes the integrated launch clutch and drive sheave for a CVT of Example 7, further includes a biasing member configured to assert a desired bias force on the clutch piston to achieve a desired activation configuration between the movable sheave member and the clutch piston.

Example 9 includes the integrated launch clutch and drive sheave for a CVT of Example 7, further including a launch clutch shaft. The basket rotationally mounted on the launch clutch shaft. The launch clutch shaft is operationally coupled to the drive sheave post.

Example 10 includes the integrated launch clutch and drive sheave for a CVT of Example 7, wherein the clutch basket, the clutch pack and the clutch piston are mounted on the drive sheave post.

Example 11 includes an integrated launch clutch and drive sheave for a continuously variable transmission (CVT). The integrated launch clutch and drive sheave for a CVT including a drive sheave, a launch clutch and a hydraulic system. The drive sheave including a fixed sheave member that is statically mounted on a drive sheave post and a movable sheave member that is slidably mounted on and rotationally fixed to the drive sheave post. The launch clutch is in rotational communication with a motor. The launch clutch is configured to selectively couple engine torque from the motor to the drive sheave post of the drive sheave. The launch clutch is in hydraulic communication with the drive sheave. The launch clutch includes a clutch pack and clutch piston. The clutch pack is configured to selectively couple torque between a motor and the drive sheave post. The clutch piston is configured to be manipulated by hydraulic pressure. The hydraulic system providing hydraulic communication between the launch clutch and drive sheave, the hydraulic system configured to both activate the launch clutch to selectively couple engine torque between the motor and the drive sheave and to axially move the movable sheave member on the drive sheave post of the drive sheave in relation to the fixed sheave member. The hydraulic system includes a hydraulic pump configured to generate the hydraulic pressure. The drive sheave post has at least one drive sheave post passage that is configured to provide a passage for the hydraulic pressure from the hydraulic pump to at least a movable sheave chamber formed by the movable sheave member and a sheave stator.

Example 12 includes the integrated launch clutch and drive sheave for a CVT of Example 11, further including a clutch basket and a launch clutch shaft. The clutch basket is in rotational communication with the motor. The launch clutch mounted on the launch clutch shaft. The launch clutch shaft has at least one launch shaft passage. The at least one launch shaft passage provides a passage for the hydraulic pressure to the launch clutch.

Example 13 includes the integrated launch clutch and drive sheave for a CVT of Example 12, wherein at least one launch shaft passage of the launch clutch shaft is in fluid communication with at least one drive sheave post passage of the drive sheave post.

Example 14 includes the integrated launch clutch and drive sheave for a CVT of any of the Examples 11-13, wherein the sheave stator including at least one stator passage configured to provide a path that equalizes hydraulic pressure between a launch clutch chamber of the launch clutch and a movable sheave chamber of the drive sheave such that the launch clutch and drive sheave are activated by a same hydraulic signal used to control the hydraulic system Example 15 includes the integrated launch clutch and drive sheave for a CVT of any of the Examples 11-14, wherein the integrated hydraulic system further includes a hydraulic control valve that is in fluid communication with the hydraulic plump. The hydraulic control valve is configured to control fluid flow and pressure to the launch clutch and the drive sheave such that the hydraulic control valve, the launch clutch and drive sheave are all in hydraulic communication.

Example 16 includes the integrated launch clutch and drive sheave for a CVT of any of the Examples 11-15, further including a biasing member configured to assert a desired bias force on the clutch piston to achieve a desired activation configuration between the movable sheave member and the clutch piston.

Example 17 includes a vehicle. The vehicle includes a motor, a drivetrain and a CVT that is configured to communicate torque between the motor and the drivetrain. The CVT has an integrated launch clutch and drive sheave. The integrated launch clutch and drive sheave includes a drive sheave, a launch clutch and an integrated hydraulic system. The drive sheave includes a fixed sheave member that is statically mounted on a drive sheave post and a movable sheave member that is slidably mounted on and rotationally fixed to the drive sheave post. The launch clutch is in rotational communication with a motor. The launch clutch is configured to selectively couple engine torque from the motor to the drive sheave post of the drive sheave. The launch clutch is in hydraulic communication with the drive sheave. The integrated hydraulic system providing hydraulic communication between the launch clutch and drive sheave, the hydraulic system configured to both activate the launch clutch to selectively couple engine torque between the motor and the drive sheave and to axially move the movable sheave member on the drive sheave post of the drive sheave in relation to the fixed sheave member.

Example 18 includes the vehicle of Example 17, wherein the integrated hydraulic system further includes a hydraulic pump to generate hydraulic pressure. The drive sheave post has at least one drive sheave post passage that is configured to provide a passage for the hydraulic pressure from the hydraulic pump to at least a movable sheave chamber that is formed by the movable sheave member and a sheave stator.

Example 19 includes the vehicle of any of the Examples 17-18, further including a launch clutch shaft. The launch clutch is mounted on the launch clutch shaft. The launch clutch shaft has at least one launch shaft passage. The at least one launch shaft passage provides a passage for the hydraulic pressure to the launch clutch.

Example 20 includes the vehicle of Example 19, wherein at least one launch shaft passage of the launch clutch shaft is in fluid communication with at least one drive sheave post passage of the drive sheave post.

Example 21 includes the vehicle of any of the Examples 17-20, wherein the launch clutch further includes a clutch basket, a clutch pack, a clutch piston and a biasing member. The clutch basket is in rotational communication with the motor. The clutch pack is configured to selectively couple torque between the clutch basket and the drive sheave post. The clutch piston is configured to be manipulated by hydraulic pressure from the integrated hydraulic system to selectively activate the clutch pack. The biasing member is configured to assert a desired bias force on the clutch piston to achieve a desired activation configuration between the movable sheave member and the clutch piston.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An integrated launch clutch and drive sheave for a continuously variable transmission (CVT) comprising:
   a drive sheave including,
      a fixed sheave member statically mounted on a drive sheave post;
      a movable sheave member slidably mounted on and rotationally fixed to the drive sheave post;
   a launch clutch in rotational communication with a motor, the launch clutch configured to selectively couple engine torque from the motor to the drive sheave post of the drive sheave, the launch clutch being in hydraulic communication with the drive sheave; and
   an integrated hydraulic system configured to both activate the launch clutch to selectively couple engine torque between the motor and the drive sheave and to axially move the movable sheave member on the drive sheave post of the drive sheave in relation to the fixed sheave member.

2. The integrated launch clutch and drive sheave for a CVT of claim 1, wherein the integrated hydraulic system further comprises:
   a hydraulic pump to generate hydraulic pressure; and
   the drive sheave post having at least one drive sheave post passage configured to provide a passage for the hydraulic pressure from the hydraulic pump to at least a movable sheave chamber formed by the movable sheave member and a sheave stator.

3. The integrated launch clutch and drive sheave for a CVT of claim 2, further comprising:
   a launch clutch shaft, the launch clutch mounted on the launch clutch shaft, the launch clutch shaft having at least one launch shaft passage, the at least one launch shaft passage providing a passage for the hydraulic pressure to the launch clutch.

4. The integrated launch clutch and drive sheave for a CVT of claim 3, wherein at least one launch shaft passage of the launch clutch shaft is in fluid communication with at least one drive sheave post passage of the drive sheave post.

5. The integrated launch clutch and drive sheave for a CVT of claim 2, further wherein the sheave stator including at least one stator passage configured to provide a path that equalizes hydraulic pressure between a launch clutch chamber of the launch clutch and a movable sheave chamber of the drive sheave such that the launch clutch and drive sheave are activated by a same hydraulic signal used to control the hydraulic system.

6. The integrated launch clutch and drive sheave for a CVT of claim 2, wherein the integrated hydraulic system further comprises:
   a hydraulic control valve in fluid communication with the hydraulic plump, the hydraulic control valve configured to control fluid flow and pressure to the launch clutch and the drive sheave such that the hydraulic control valve, the launch clutch and drive sheave are all in hydraulic communication.

7. The integrated launch clutch and drive sheave for a CVT of claim 1, wherein the launch clutch further comprises:
   a clutch basket that is in rotational communication with the motor;
   a clutch pack configured to selectively couple torque between the clutch basket and the drive sheave post; and
   a clutch piston configured to be manipulated by hydraulic pressure from the integrated hydraulic system to selectively activate the clutch pack.

8. The integrated launch clutch and drive sheave for a CVT of claim 7, further comprising:
   a biasing member configured to assert a desired bias force on the clutch piston to achieve a desired activation configuration between the movable sheave member and the clutch piston.

9. The integrated launch clutch and drive sheave for a CVT of claim 7, further comprising:
a launch clutch shaft, the basket rotationally mounted on the launch clutch shaft, the launch clutch shaft operationally coupled to the drive sheave post.

10. The integrated launch clutch and drive sheave for a CVT of claim 7, wherein the clutch basket, the clutch pack and the clutch piston are mounted on the drive sheave post.

11. An integrated launch clutch and drive sheave for a continuously variable transmission (CVT) comprising:
a drive sheave including,
a fixed sheave member statically mounted on a drive sheave post, and
a movable sheave member slidably mounted on and rotationally fixed to the drive sheave post;
a launch clutch in rotational communication with a motor, the launch clutch configured to selectively couple engine torque from the motor to the drive sheave post of the drive sheave, the launch clutch being in hydraulic communication with the drive sheave, the launch clutch including,
a clutch pack configured to selectively couple torque between a motor and the drive sheave post, and
a clutch piston configured to be manipulated by hydraulic pressure to selectively activate the clutch pack; and
a hydraulic system providing hydraulic communication between the launch clutch and drive sheave, the hydraulic system configured to activate the launch clutch to selectively couple engine torque between the motor and the drive sheave and to axially move the movable sheave member on the drive sheave post of the drive sheave in relation to the fixed sheave member, the hydraulic system including,
at least one hydraulic pump to generate the hydraulic pressure, the drive sheave post having at least one drive sheave post passage configured to provide a passage for the hydraulic pressure from the hydraulic pump to at least a movable sheave chamber formed by the movable sheave member and a sheave stator.

12. The integrated launch clutch and drive sheave for a CVT of claim 11, further comprising:
a clutch basket that is in rotational communication with the motor; and
a launch clutch shaft, the clutch basket mounted on the launch clutch shaft, the launch clutch shaft having at least one launch shaft passage, the at least one launch shaft passage providing a passage for the hydraulic pressure to the launch clutch.

13. The integrated launch clutch and drive sheave for a CVT of claim 12, wherein at least one launch shaft passage of the launch clutch shaft is in fluid communication with at least one drive sheave post passage of the drive sheave post.

14. The integrated launch clutch and drive sheave for a CVT of claim 11, wherein the sheave stator including at least one stator passage configured to provide a path that equalizes hydraulic pressure between a launch clutch chamber of the launch clutch and a movable sheave chamber of the drive sheave such that the launch clutch and drive sheave are activated by a same hydraulic signal used to control the hydraulic system.

15. The integrated launch clutch and drive sheave for a CVT of claim 11, wherein the hydraulic system further comprises:
a hydraulic control valve in fluid communication with the hydraulic plump, the hydraulic control valve configured to control fluid flow and pressure to the launch clutch and the drive sheave such that the hydraulic control valve, the launch clutch and drive sheave are all in hydraulic communication.

16. The integrated launch clutch and drive sheave for a CVT of claim 11, further comprising:
a biasing member configured to assert a desired bias force on the clutch piston to achieve a desired activation configuration between the movable sheave member and the clutch piston.

17. A vehicle comprising:
a motor;
a drivetrain;
a continuously variable transmission (CVT) configured to communicate torque between the motor and the drivetrain, the CVT having an integrated launch clutch and drive sheave, the integrated launch clutch and drive sheave including,
a drive sheave including,
a fixed sheave member statically mounted on a drive sheave post, and
a movable sheave member slidably mounted on and rotationally fixed to the drive sheave post;
a launch clutch in rotational communication with a motor, the launch clutch configured to selectively couple engine torque from the motor to the drive sheave post of the drive sheave, the launch clutch being in hydraulic communication with the drive sheave; and
an integrated hydraulic system providing hydraulic communication between the launch clutch and drive sheave, the hydraulic system configured to both activate the launch clutch to selectively couple engine torque between the motor and the drive sheave and to axially move the movable sheave member on the drive sheave post of the drive sheave in relation to the fixed sheave member.

18. The vehicle of claim 17, wherein the integrated hydraulic system further comprises:
a hydraulic pump to generate hydraulic pressure; and
the drive sheave post having at least one drive sheave post passage configured to provide a passage for the hydraulic pressure from the hydraulic pump to at least a movable sheave chamber formed by the movable sheave member and a sheave stator.

19. The vehicle of claim 17, further comprising:
a launch clutch shaft, the launch clutch mounted on the launch clutch shaft, the launch clutch shaft having at least one launch shaft passage, the at least one launch shaft passage providing a passage for the hydraulic pressure to the launch clutch.

20. The vehicle of claim 19, wherein at least one launch shaft passage of the launch clutch shaft is in fluid communication with at least one drive sheave post passage of the drive sheave post.

21. The vehicle of claim 17, wherein the launch clutch further comprises:
a clutch basket that is in rotational communication with the motor;
a clutch pack configured to selectively couple torque between the clutch basket and the drive sheave post;
a clutch piston configured to be manipulated by hydraulic pressure from the integrated hydraulic system to selectively activate the clutch pack; and a biasing member configured to assert a desired bias force on the clutch piston to achieve a desired activation configuration between the movable sheave member and the clutch piston.

\* \* \* \* \*